United States Patent [19]
Schick

[11] 3,865,240
[45] Feb. 11, 1975

[54] PURIFICATION OF BENTONITE

[76] Inventor: Paul Schick, Leutstettener Strasse 49, 8000 Munich 71, Germany

[22] Filed: July 2, 1973

[21] Appl. No.: 375,669

Related U.S. Application Data

[63] Continuation-in-part of Ser. No. 163,614, July 19, 1971, abandoned.

[30] Foreign Application Priority Data
July 21, 1970 Germany.......................... 2036152

[52] U.S. Cl................... 209/5, 106/DIG. 4, 210/49
[51] Int. Cl.............................................. B03d 3/00
[58] Field of Search............ 106/72, 288 B, DIG. 4; 209/5; 210/47, 49, 42, 52–54

[56] References Cited
UNITED STATES PATENTS

| | | | |
|---|---|---|---|
| 2,981,630 | 4/1961 | Rowland | 210/54 X |
| 3,464,634 | 9/1969 | Brociner | 209/5 X |
| 3,477,565 | 11/1969 | Cecil et al. | 209/5 |
| 3,536,264 | 10/1970 | Helton et al. | 209/5 X |
| 3,596,760 | 8/1971 | Jacobs et al. | 209/5 |
| 3,617,561 | 11/1971 | Fanselow | 210/47 |

OTHER PUBLICATIONS

Bechtner, Paul, "Bentonite," Industrial Minerals & Rocks, A.I.M.M.E., 1937, pp. 129–134.

Primary Examiner—Thomas G. Wyse
Attorney, Agent, or Firm—Hans Berman

[57] ABSTRACT

Finely comminuted, crude bentonite may be purified of accompanying quartz, muscovite, illite, feldspar, iron oxide and like impurities by pouring an aqueous slurry of the clay into a very dilute aqueous solution of a technical grade of sodium hexametaphosphate, and letting the mixture stand a few minutes, whereby almost the entire mineral impurities present are precipitated. The supernatant liquid and the purified bentonite suspended therein are separated from each other by filtering or centrifuging, and the mother liquor may be recycled.

8 Claims, 1 Drawing Figure

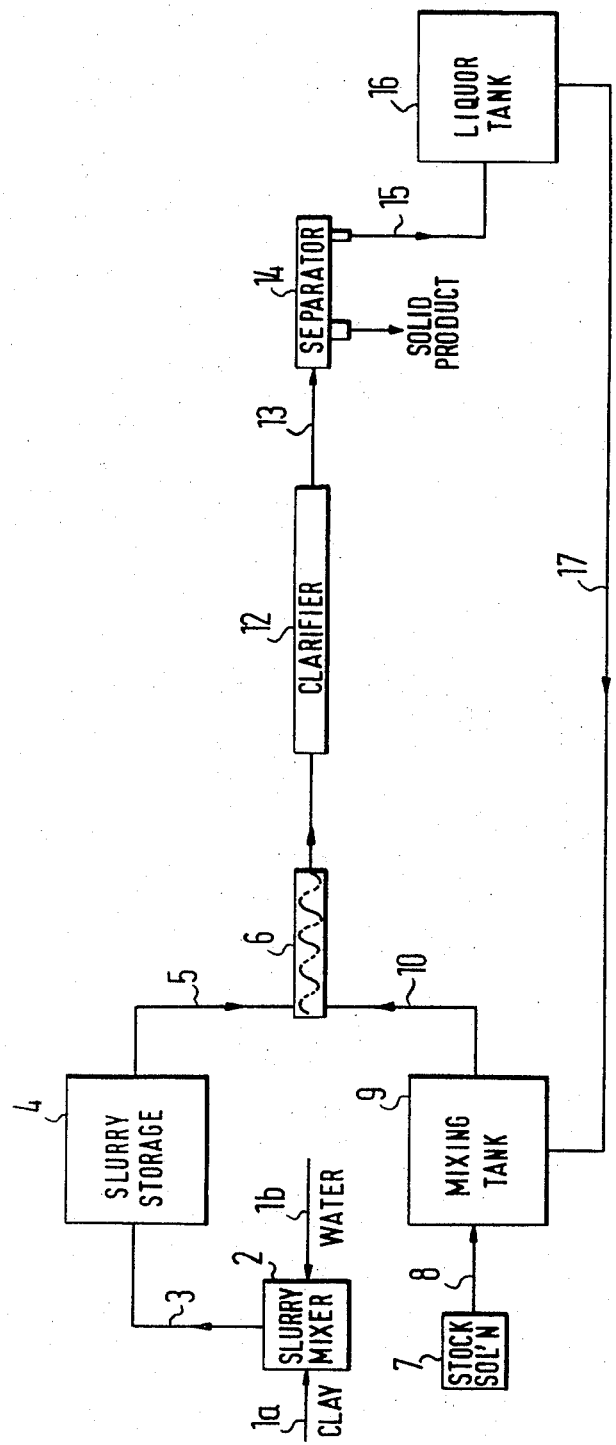

PURIFICATION OF BENTONITE

This application is a continuation-in-part of the copending application Ser. No. 163,614, filed on July 19, 1971, and now abandoned.

This invention relates to the purification of bentonite, and particularly to a method of purifying bentonite of accompanying mineral impurities.

Native bentonite is normally accompanied by other mineral materials which vary in amount and composition according to the location at which the bentonite is mined or quarried. It is often necessary to remove the impurities before the bentonite is ready for use.

It is known to suspend comminuted bentonite in water, and to separate the impurities from the suspension by means of chemcial agents. It is a common shortcoming of the known purification methods that they require much water and are time-consuming. The cost of purification limits the types of bentonites worth purifying.

It has now been found that practically all ingredients other than montmorillonite are readily removed from crude bentonite by preparing a slurry from the crude mineral in comminuted form and water, diluting the slurry with a much larger amount of a very dilute solution of a sodium polymetaphosphate, such as sodium hexametaphosphate, letting the suspension so obtained settle for a few minutes, separating the supernatant liquid and the solid material still suspended therein from the settled precipitate, and collecting the suspended solid material from the separated supernatant liquid. The settled precipitate is found to contain most of the impurities, and the solids collected from the supernatant consist of almost pure montmorillonite.

The very small amounts of the precipitating agent which are still present in the collected product are normally acceptable even when the product is to be used in the food industry or pharmaceutical industry since it does not produce undesirable physiological effects when ingested. The product is surprisingly uniform in purity when prepared from raw materials varying greatly in the nature and amount of the mineral impurities present.

The water employed for preparing the original slurry and the sodium polymetaphosphate solution does not have to meet particular requirements, and any water fit for drinking can be used. The polymetaphosphate need not be a compound of a specific molecular weight, and all known glassy metaphosphates of the formula $(NaPO_3)_n$ wherein $n$ is an interger greater than 1, and may be as great as 10, are useful. Sodium hexametaphosphate of a technical grade is presently available at lowest cost and preferred for this reason. It may contain other polymetaphosphates, particularly the tri- and tetrametaphosphate, which are also effective, and usually contains sodium pyrophosphate which is not harmful when present in small amounts, but does not produce the desired effect.

The ratio of water and comminuted mineral matter in the slurry initially prepared is determined by the required handling characteristics, the method employed for diluting the slurry, and the swelling characteristics of the bentonite. Preferably, the weight ratio of bentonite to water should be between 1:1.5 and 1:2.

The sodium polymetaphosphate solution employed is very dilute. As little as 0.5% of the phosphate, based on the weight of the crude bentonite in the diluted suspension, causes rapid precipitation of the undesired ingredients of the raw material. Amounts greater than 1% are unnecessary and uneconomical and interfere with the precipitation.

The slurry is preferably diluted by adding the slurry in a continuous thin stream, when sufficiently fluid, or in small batches to the diluent containing the precipitating agent. The mixture is stirred slowly to disperse the slurry in the dilute aqueous medium without increasing the viscosity of the mixture, and the agitating period normally can be terminated within 3 to 5 minutes.

Precipitation of the impurities starts at once, and is normally completed within 3 to 15 minutes, usually 5 to 10 minutes. The ratio of the slurry and of the polymetaphosphate solution has some bearing on the settling time. While it is essential that the amount of the phosphate solution be much greater than that of the slurry in order to obtain a mixture of low viscosity and correspondingly high settling rate, the optimum ratio, or even the limits of useful ratios must be determined by trial and error for each set of operating conditions. The solids in the sedimentation mixture should usually amount to 5 – 30% by weight.

The precipitated impurities form a dense and compact layer, and the supernatant liquid containing the purified bentonite as a suspended solid phase is readily separated from the precipitate by decanting or in any other manner. It is then simple enough to collect the bentonite from the liquid by filtering, centrifuging, or the like. The mother liquor free of the desired product still contains significant amounts of sodium polymetaphosphate and may be recycled for use with another amount of slurry. The moist bentonite is dried to a powder ready for further use.

Approximately 90% of the mineral impurities present in crude bentonite are readily removed during a sedimentation period of ten minutes or less. The precipitated impurities include virtually all the quartz, feldspar, illite, muscovite, and iron oxides initially present in the crude mineral product. A single sedimentation treatment is usually sufficient to produce a bentonite suitable for foundry use, as a decolorizing agent, and for many other applications.

When the suspension separated from the original precipitate is transferred to another vessel and permitted to stand again for about ten minutes, an additional precipitate of impurities is formed, and the procedure may be repeated a third time when a product of yet greater purity is desired. For highest purity, the purified bentonite obtained in the complete cycle described above is again stirred into a sodium polymetaphosphate solution and further processed, as described above, and this procedure also may be repeated again to obtain a bentonite containing about 99% montmorillonite.

The sodium polymetaphosphate consumed accounts for a substantial portion of the overall cost of the purification treatment, and this cost can be reduced greatly by recycling the mother liquor from which the purified material was collected by centrifugal separation, filtering, or the like. The recycled liquor may require an addition of concentrated stock solution of sodium polymetaphosphate to restore its original strength, but is otherwise ready for diluting a further batch of bentonite slurry. As much as 50% of the required sodium polymetaphosphate may be derived from the recycled liquor.

Agitation during diluting of the slurry with the phosphate solution must be controlled carefully for best results. The viscosity of the diluted slurry increases with excessive agitation so as to interfere with rapid settling of the impurities, and it is preferred to monitor the viscosity and to hold the stirring rate at a value at which significant viscosity increase does not yet occur. The highest permissible stirring rate depends on many factors, including the shape of the mixing vessel, and must be determined experimentally for each new set of operating conditions.

When the mother liquor from which the purified material was collected is recycled in the manner described above, the problem of waste liquid disposal is greatly reduced or solved. No accumulation of extremely fine suspended particles in the liquor has been observed during repeated recycling so that only a very small fraction of the liquor need to be discarded after each cycle to prevent the accumulation of other impurities in the liquid phase. These impurities, however are not solid or have such a small solids content as not to present a serious waste disposal problem. A further reduction in the amount of liquid discharged from a continuously operating bentonite purification installation of the invention is achieved by simultaneous purification of two grades of bentonite requiring different amounts of process water. The excess liquid resulting from processing the bentonite requiring the larger amount of water is employed for the bentonite using less water. Such a mode of operation merely calls for the use of an auxiliary storage container for the excess liquor resulting from processing the bentonite requiring more water.

The sole figure of the appended drawing is a flow sheet of an installation for purifying bentonite in continuous operation according to the invention.

Feed lines 1a, 1b respectively supply water and comminuted crude bentonite to a mixer 2 in a suitable ratio for forming a slurry which is transferred through a line 3 to a temporary storage tank 4, and metered from the tank 4 through a line 5 to a screw mixer 6.

A stock solution of sodium hexametaphosphate is prepared in a tank 7, transferred through a line 8 to a mixing tank 9 for dilution with recycled mother liquor, as will presently be described, and the precipitating solution so produced is fed to the mixer 6 through a line 10. The screw in the mixer 6 is operated at a speed to avoid a viscosity increase in the mixture which is transferred from the mixer 6 to trough-shaped, rectangular clarifier 12. The dwell time in the clarifier is approximately 5 to 10 minutes and sufficient to cause precipitation of the mineral impurities from the diluted bentonite suspension.

The sediment is removed in a conventional manner not illustrated, and the supernatant suspension of purified solids in a liquid still containing much of the initial sodium hexametaphosphate flows through a line 13 into a continuously discharging centrifugal separator 14. The purified solid product, still bearing some liquid, is discharged separately from the mother liquor which flows from the separator through a line 15 to a liquor storage tank 16. It may be returned from there to the mixing tank 9 through a return line 17, and a small portion of the liquor may be discharged to waste to maintain an equilibrium of dissolved impurities in the processing liquid.

While only a single clarifier 12 has been shown, it is preferred in industrial application of this method to arrange two or more clarifiers in a parallel arrangement between the screw mixer 6 and the centrifugal separator 14 to permit uninterrupted operation while one clarifier is being cleaned. It will be appreciated that necessary pumps, valves, gages, and the like have been omitted from the drawing since they will be obvious to those skilled in the art.

The surprisingly quick selective precipitation of the impurities from the diluted bentonite slurry by the sodium polymetaphosphate permits the dimensions of the clarifier 12 to be relatively small. The water consumption is limited to the small amounts required for preparing a slurry of the starting mineral matter and a stock solution of sodium polymetaphosphate. The amount of waste liquid discharged and requiring disposal is correspondingly small. Little sodium polymetaphosphate is consumed, and even less finds its way into the end product. The amounts present in the purified bentonite are normally too small to warrant further purification even if the product is to be ingested by humans. It is a particular advantage of the method of the invention that the removed impurities include iron oxides present as such in the mineral matter. Discoloration is caused in many products containing iron-bearing bentonite, and is avoided with the products purified according to this invention.

The ability of bentonites to absorb water and to swell, important for many applications, is not unfavorably affected by the purification method of the invention. The purified bentonites of the invention are readily converted to sodium bentonite for foundry use with amounts of soda ash much smaller than are required with the naturally occuring calcium bentonites which may require about 5% soda ash.

The method of the invention readily produces adequately pure bentonite of high montmorillonite content from crude bentonites too low in montmorillonite for economical processing by methods known heretofore, and very pure montmorillonite suitable for use in catalysts, porcellain, paper, and the like is prepared more economically than by any other method now in commercial use.

It is an outstanding feature of the invention that the purification method employs but a single chemical agent and does not involve any chemical treatment for removal or neturalization of that agent, because the agent does not actually enter into a chemical reaction.

The process conditions are flexible, and few conditions are critical. The method is simple enough to permit process variables to be adjusted to optimum values with very little experimentation for any new set of conditions. Results achieved are readily duplicated when the same set of conditions is again encountered.

The polymetaphosphates differ in their action on bentonite from other phosphates equally effective as precipitating agents for the contaminants in that they do not interfere with ultimate drying of the bentonite to a powdery product if the time of contact between the bentonite and the phosphate solution is kept short. Phosphoric acid or orthoposphate ions present in drying bentonite cause agglomeration of the bentonite particles. The dried product is a coherent cake and has lost much of its swelling ability. The polymetaphosphates hydrolyze slowly to orthophosphate in contact with bentonite at the ambient temperatures (10° to approximately 30°C) at which the method of the invention is normally carried out, and much more slowly than the pyrophosphates.

It is important, therefore, that the technical grade of polymetaphosphates preferably employed contain pyrophosphates only in minor amounts, and that the time of contact between the bentonite and the precipitating solution be held to a minimum. Accordingly, the operating conditions must be chosen so that the impurities settle quickly, preferably in less than 15 minutes, that the supernatant carrying the dispersed particles of purified bentonite be separated promptly from the sediment, and that the bentonite particles be recovered at once from the mother liquor.

In this sequence of steps, the settling of the impurities consumes most of the total time of contact between the bentonite particles and the polymetaphosphate, and operating conditions which retard settlement must be avoided. Therefore, the mixture of crude bentonite and polymetaphosphate should have the lowest possible viscosity. Bentonite differs from other clays by the fact that polymetaphosphates do not significantly reduce the viscosity of bentonite suspensions, and thus do not act as deflocculating agents. Stirring a mixture of bentonite and polymetaphosphate solution causes practically as much of a viscosity increase as stirring a mixture of bentonite and water. The crude bentonite thus may not be stirred dry into the precipitating solution, nor may the precipitating solution be poured over the dry bentonite, and the desired dispersion achieved by agitation. Much bentonite is being retained in the sediment under the last-mentioned conditions.

While different methods are available under laboratory conditions and on a laboratory scale, the sole procedure permitting selective precipitation of mineral impurities from bentonite according to this invention on an industrial scale that I am aware of at this time requires the crude bentonite to be slurried with water sufficient for complete wetting of the comminuted material, and the slurry to be introduced into a large excess of polymetaphosphate solution at a rate to permit the added slurry to be dispersed in the solution quickly and uniformly with so little agitation that the viscosity of the mixture is not significantly increased.

Preferably, the slurry is made fluid enough that it may be poured into the polymetaphosphate solution in a thin stream. The afore-mentioned ratio of crude bentonite to water of 1:1.5 – 2 normally suffices for this purpose. When the slurry contains less water or is agitated strongly, it will not flow freely and must be added in small batches to the polymetaphosphate solution. In either event, agitation is to be discontinued within five minutes, and the slurry added in such a manner that the bentonite is uniformly distributed in the liquid phase when agitation is discontinued. Under most conditions, the impurities present settle quickly as soon as stirring is stopped, while the bentonite particles, essentially consisting of or at least enriched with montmorillonite, remain in suspension although they do not differ greatly from the particles of the impurities in their size and may not differ significantly from at least some of the impurities in their specific gravity.

The method of the invention is based on the fact that the bentonite suspension is stabilized by the polymetaphosphates while the impurities to be removed are precipitated by the same agent. However, the polymetaphosphates cannot prevent precipitation of the bentonite particles when the suspension is subjected to severe stresses, and the bentonite suspension may be resolved into its constituent elements by vigorous agitation and decantation instead of the preferred filtering or centrifuging step.

The following Examples further illustrates the invention. All parts or percentages are by weight unless stated otherwise.

EXAMPLE 1

A crude, comminuted bentonite containing approximately 35% water as received from the mine was stirred with twice its weight of spring water to produce a free-flowing slurry. The slurry was introduced from above in a continuous, thin stream discharged from a multiple-aperture nozzle into a solution of sodium hexametaphosphate with stirring. The weight of the solution was approximately five times the weight of the original bentonite, and it contained 0.1% of the polymetaphosphate.

The suspension so obtained was left to stand quietly for about 5 to 7 minutes, whereby impurities amounting to approximately 30% of the original bentonite weight, on a dry basis, were precipitated. The precipitate included 90% of the impurities originally present. The supernatant suspension was immediately subjected to centrifugal separation, and the liquid discharged from the centrifuge was used again for precipitating impurities from another batch of bentonite slurry after replenishing its polymetaphosphate content.

The solids discharged from the centrifugal separator were dried. They were of a purity sufficient for foundry use or as a decolorizing agent in the chemical industry.

A purer product was obtained by separating the supernatant suspension from the precipitated impurities, and transferring the suspension to another sedimentation vessel in which additional impurities were permitted to settle out during 5 to 10 minutes before the resulting suspension was drawn off either to yet another sedimentation vessel for further precipitation or to the centrifugal separator. No further chemicals were added for the second or third sedimentation.

EXAMPLE 2

100 Lbs. comminuted crude bentonite and 150 lbs. spring water were agitated until a stiff slurry was obtained. Small batches of the slurry were sequentially stirred into a solution prepared from 100 lbs. water and 0.6 lbs. sodium hexametaphosphate. The suspension so obtained was passed in continuous flow through a centrifugal separator rotating at relatively low speed. The solids precipitated consisted of particles of the minerals present in the starting materials as impurities, and the separately discharged suspension of partly purified bentonite was centrifuged. The moist bentonite, stripped of much of its initial impurities, was further processed as described in Example 1, and the resulting bentonite powder was pure enough for use in food processing.

EXAMPLE 3

A crude bentonite obtained from a mine in Bavaria was stirred with 150 lbs. water per 100 lbs. bentonite in the mixer 2 of the apparatus illustrated in the drawing, and the slurry so produced was transferred to the storage tank 4.

0.7 Lb. sodium hexametaphosphate was dissolved in 400 lbs. water in the mixer 9, and the solution obtained was gradually and continuously combined with the bentonite slurry in the mixer 6 whose agitator was operated so slowly that no significant increase in the viscosity of the mixture was caused.

The suspension was transferred in continuous stream to the clarifier 12 where the impurities settled out during a dwell time of approximately 7 minutes, while the supernatant purified suspension was fed to the centrifugal separator 14. The moist purified bentonite was recovered, and the mother liquor was returned to the mixer 9 in which it was regenerated by metered addition of a more concentrated stock solution of sodium hexametaphosphate.

The several crude bentonites referred to in the three Examples has the following average composition, in percent by weight:

| | |
|---|---|
| $SiO_2$ | 57.0 % |
| $Al_2O_3$ | 21.2 % |
| $Fe_2O_3$ | 5.1 % |
| $TiO_2$ | 0.2 % |
| CaO | 4.5 % |
| MgO | 2.1 % |
| $K_2O$ | 1.4 % |
| $Na_2O$ | 0.2 % |
| Volatile | 8.2 % |

The montmorillonite content varied between 60 and 80 percent.

It will be appreciated that the apparatus employed in the preceding Example may be chosen according to availability or specific preference. Thus, the screw mixer 6 may be replaced by equipment in which the slurry or the polymetaphosphate solution is introduced into the other component by means of an injector, carefully controlling the energy supplied so as to avoid an undue rise in viscosity. The mixer 6 and/or the clarifier 12 may also be replaced not only by the slow-running centrifuge referred to in Example 2, but also by a tank equipped with slowly rotating agitating blades. The slurry and the phosphate solution may be mixed in the tank, and much of the sediment may be precipitated right there, the remainder being settled out in the clarifier 12, or the dwell time in the tank may be long enough to make the clarifier unnecessary.

While the invention has been described with particular reference to specific embodiments, it is to be understood that it is not limited thereto, but is to be construed broadly and restricted solely by the scope of the appended claims.

What is claimed is:

1. A method of purifying crude bentonite of accompanying impurities selected from the group consisting of quartz, feldspar, illite, and muscovite, which comprises:

a. mixing one part of said crude bentonite in comminuted condition with about 1.5 to 2.0 parts of water sufficient to form a fluid slurry;

b. introducing said slurry into a much larger amount of a dilute, aqueous solution of a sodium polymetaphosphate of the formula $(NaPO_3)_n$, $n$ being an interger between 2 and 10, the amount of said sodium polymetaphosphate in said solution being at least 0.5% of the weight of said crude bentonite.

1. said slurry being introduced into said solution with agitation sufficient to disperse said crude bentonite uniformly in said solution while avoiding a significant increase in the viscosity of the resulting mixture due to said agitation, 2. the amount of said slurry being sufficient to make the solids content of said resulting mixture between 5% and 30%;

c. permitting the resulting mixture to settle until at least a major portion of said impurities is precipitated, but not substantially longer than 15 minutes, while bentonite enriched with montmorillonite remains suspended in the supernatant liquid;

d. separating the precipitated impurities from the supernatant liquid and the enriched bentonite suspended therein; and e. collecting the enriched bentonite from the supernatant liquid.

2. A method as set forth in claim 1, wherein said slurry is free-flowing and is poured into said solution in a continuous stream from above.

3. A method as set forth in claim 2, wherein said solution is agitated during said pouring of said slurry, but not longer than five minutes.

4. A method as set forth in claim 1, wherein the amount of said sodium polymetaphosphate in said solution is sufficient to make the amount of said sodium polymetaphosphate in said diluted slurry 0.5% to 1.0% of the weight of said crude bentonite.

5. A method as set forth in claim 4, wherein the principal constituent of said sodium polymetaphosphate is sodium hexametaphosphate.

6. A method as set forth in claim 1, wherein said 15 minutes constitute most of the total time of contact between said suspended bentonite and said dilute solution of sodium polymetaphosphate in water, and the combined time of said separating and of said collecting is less than said 15 minutes.

7. A method as set forth in claim 6, wherein the particle size of said suspended bentonite does not differ significantly from the particle size of said impurities.

8. A method as set forth in claim 6, wherein the specific gravity of said gravity of said impurities.

* * * * *